United States Patent [19]

Bergen

[11] Patent Number: 5,710,874
[45] Date of Patent: Jan. 20, 1998

[54] SYSTEM FOR MANAGING PRINTING SYSTEM MEMORY WITH MACHINE READABLE CODE

[75] Inventor: George F. Bergen, Penfield, N.Y.

[73] Assignee: Xerox Corporation, Stamford, Conn.

[21] Appl. No.: 548,240

[22] Filed: Oct. 25, 1995

[51] Int. Cl.⁶ .................................................. G06K 15/00
[52] U.S. Cl. .......................... 395/115; 395/106; 395/112; 395/113
[58] Field of Search ........................ 395/101, 112–113, 395/115–116, 106, 830, 831, 834, 892, 893; 358/401, 406; 400/76; 364/478.13, 478.14, 478.15; 380/3–5, 21, 51, 55, 23; 399/82, 85–87

[56] References Cited

U.S. PATENT DOCUMENTS

| | | | |
|---|---|---|---|
| 4,716,438 | 12/1987 | Farrell | 355/6 |
| 4,757,348 | 7/1988 | Rourke et al. | 355/6 |
| 4,970,554 | 11/1990 | Rourke | 355/202 |
| 4,987,447 | 1/1991 | Ojha | 355/204 |
| 5,085,529 | 2/1992 | McGourty et al. | 400/76 |
| 5,168,371 | 12/1992 | Takayangi | 380/23 |
| 5,170,340 | 12/1992 | Prokop et al. | 364/143 |
| 5,212,786 | 5/1993 | Sathi | 395/600 |
| 5,243,381 | 9/1993 | Hube | 355/204 |

OTHER PUBLICATIONS

Acquavius, Thomas, "Slip Sheets For Exception Page Programming", Xerox Disclosure Journal, vol. 13, No. 2, Mar./Apr. 1988.

*Primary Examiner*—Arthur G. Evans
*Attorney, Agent, or Firm*—Gary B. Cohen

[57] ABSTRACT

A system for managing printing system memory in which a state of a printing system subsystem is altered between a first state and a second state by reference to a substrate including machine readable code, such as bar code. The system includes a raster image processing device for scanning the substrate to read a representation of the machine readable code. In response to receiving an authorization signal, a value in memory is altered and the state of the printing system subsystem is changed from the first state to the second state.

6 Claims, 13 Drawing Sheets

FIG. 6

SYSTEM FOR MANAGING PRINTING SYSTEM MEMORY WITH MACHINE READABLE CODE

BACKGROUND OF THE INVENTION

The present invention relates generally to a technique for managing memory in a printing system and more particularly to a system in which memory target values are recorded in the form of machine readable code and then the machine readable code is used to either replace or provide current target values for the memory.

Electronic printing systems typically include an input section, sometimes referred to as an input image terminal ("IIT"), a controller, sometimes referred to as an electronic subsystem ("ESS") and an output section or print engine, sometimes referred to as an image output terminal ("IOT"). In one type of electronic printing system, manufactured by Xerox® Corporation, known as the DocuTech® electronic printing system, a job can be inputted to the IIT from, among other sources, a network or a scanner. An example of an IIT with both network and scanner inputs is found in the following patent, the pertinent portions of which are incorporated herein by reference:

U.S. Pat. No. 5,170,340

Patentees: Prokop et al.

Issued: Dec. 8, 1992

In a digital printing machine of the type discussed above, a document can be read with a raster image scanning device and the information of the document converted to image data. In one example, the image data is buffered and a set of printing instructions is provided by way of a job ticket. As evidenced by the following patents, the printing instructions of the job ticket can be stored electronically and referred to with a bar code reference:

In the above-referenced patents, the separator sheet is read along with the document and the stored printing instructions are thereby accessed. In turn, values in memory may be adjusted so that various operational conditions can be achieved. For example, a finishing device may be enabled in accordance with the change of a value in memory. In one embodiment, the finishing device returns to a default state after the job has been executed.

U.S. Pat. No. 4,716,438

Patentee: Farrell

Issued: Dec. 29, 1987

U.S. Pat. No. 4,757,348

Patentees: Rourke et al.

Issued: Jul. 12, 1988

U.S. Pat. No. 4,970,554

Patentee: Rourke

Issued: Nov. 13, 1990

U.S. Pat. No. 5,243,381

Patentee: Hube

Issued: Sep. 7, 1993

The following patent relates to the use of a separator sheet where printing instructions are represented by bar codes present on the separator sheet:

U.S. Pat. No. 4,987,447

Patentee: Ojha

Issued: Jan. 22, 1991

In the above-mentioned patent, it is believed that one of the bar codes on the sheet can be used to change the state of a printing system subsystem. That is, the subsystem may be enabled or disabled depending on the value of the one bar code.

Further background material regarding use of slip sheets for exception page programming is provided in the following reference:

Slip Sheets for Exception Page Programming by Thomas Acquaviva

Xerox Disclosure Journal Vol. 13, No. 2 (March/ April of 1988) at p. 99

Printing machines of all types use non-volatile memory (NVM) to control, enable and generally facilitate operation thereof. In one example the NVM includes battery operated RAM. One example of NVM suited for use in a digital printing machine can be found in the following patent:

U.S. Pat. No. 5,212,786

Patentee: Sathi

Issued: May 18, 1993

As is known, the NVM serves a variety of purposes. Commonly, the NVM stores values which are used as target values to control a wide variety of operational parameters employed by various subsystems of the printing machine. In one approach, a given subsystem is controlled directly by an adjustable value while the adjustable value is controlled directly by a corresponding target or reference value—each of the adjustable and target value is stored in NVM. In one example (see generally U.S. Pat. No. 5,175,590 to Frankel et al. (Issued: Dec.29, 1992)), a charging subsystem, adjacent a photoreceptor, communicates with NVM while an electrostatic voltmeter (ESV), which also communicates with the photoreceptor, is positioned downstream of the charging subsystem. In practice, a reading from the ESV is compared with a charging related target value stored in NVM and if the reading varies from the target value by a selected deviation, then an adjustable value in NVM is changed by a preset increment. This process is repeated until the deviation is determined to be within an acceptable tolerance.

For purposes of xerographic set-up, the adjustable values may correspond with voltage values employed to control operation of the various subsystems. For instance, target values are set for subsystems such as charging, exposing, developing, transferring, cleaning and fusing subsystems, and the adjustable values are brought within reasonable tolerances through use of a processor upon which suitable software is executed. In practice, the software facilitates the reading of a sensor, such as an ESV, and a comparison of the type discussed above with respect the charging subsystem calibration is made. The values stored in NVM can be used for calibrating other functionality, such as image to photoreceptor registration and image processing operations (e.g. magnification). Further information regarding the setting of NVM values can be obtained by reference to U.S. Pat. No. 5,006,892 to Roehrs et al. (Issued: Apr. 9, 1991). Additionally, the setting of a relatively large group of target values may be required when certain boards, such as high voltage AC and DC boards, are installed in a digital printing machine.

The values stored in NVM may serve purposes other than simply calibrating operational parameters or components. For example, it is common, in digital printing machines supporting software for given features, to turn the features on and off with the NVM values. Accordingly, features ranging from finishing devices and paper trays to inputs/outputs may be enabled or disabled by simply altering bits which control a corresponding target value.

For a given digital printing machine, such as a given DocuTech printing system ("DocuTech" is a registered trademark of Xerox Corporation) nominal target values can be set by loading a software release into the control system. In turn, these values may be adjusted to accommodate for certain variations of a host machine. Assuming the host does not require any further adjustment of NVM, the user of the host is well off. However, certain occurrences can require further NVM adjustment by a customer service engineer (CSE). For example, value adjustment, as mentioned above, may be required when a board or other component is replaced. In the "worst case scenario", a catastrophic failure may require that all the NVM values be reloaded and recalibrated. Even the recalibration of NVM for a single board can be inconvenient and mistakes in recalibration can result in machine malfunction and down-time. It would be desirable to minimize the amount of labor required by the CSE in resetting NVM values as a result of component failure. Moreover, it would be desirable to eliminate CSE visits whose object is simply to modify one or more NVM values for enabling/disabling a feature.

The pertinent portions of each of the above-referenced patents is incorporated herein by reference.

SUMMARY OF THE INVENTION

In accordance with one aspect of the present invention, there is provided an operation restoring system a printing system. The printing machine, which has an operating system with a set of operating parameters, includes nonvolatile memory loaded with a set of values, the values corresponding with the set of operating parameters and being used to control the set of operating parameters. The operation restoring system, which restores operation of the printing machine when the operating system fails and one or more of the values from the set of values is lost as a result of the operating system failure, includes: a) a machine readable code generator for generating machine readable code representative of one or more values from the set of values; b) a marking engine for printing the machine readable code representative of the one or more values on a substrate; c) a raster image processing device for reading the machine readable code representative of the one or more values to create electronic data corresponding with the one or more values; and d) when the operating system fails and the one or more values are lost, said raster image processing device reading the machine readable code representative of the one or more values to convert the same to electronic data, the one or more lost values being replaced by reference to the electronic data.

These and other aspects of the invention will become apparent from the following description, the description being used to illustrate a preferred embodiment of the invention when read in conjunction with the accompanying drawings.

BRIEF DESCRIPTION OF THE DRAWINGS

FIG. 6 is a view depicting an exemplary job programming ticket and job scorecard displayed on the User Interface (UI) touchscreen of the printer shown in FIG. 1, the job ticket and job scorecard being associated with a job to be printed;

DETAILED DESCRIPTION OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
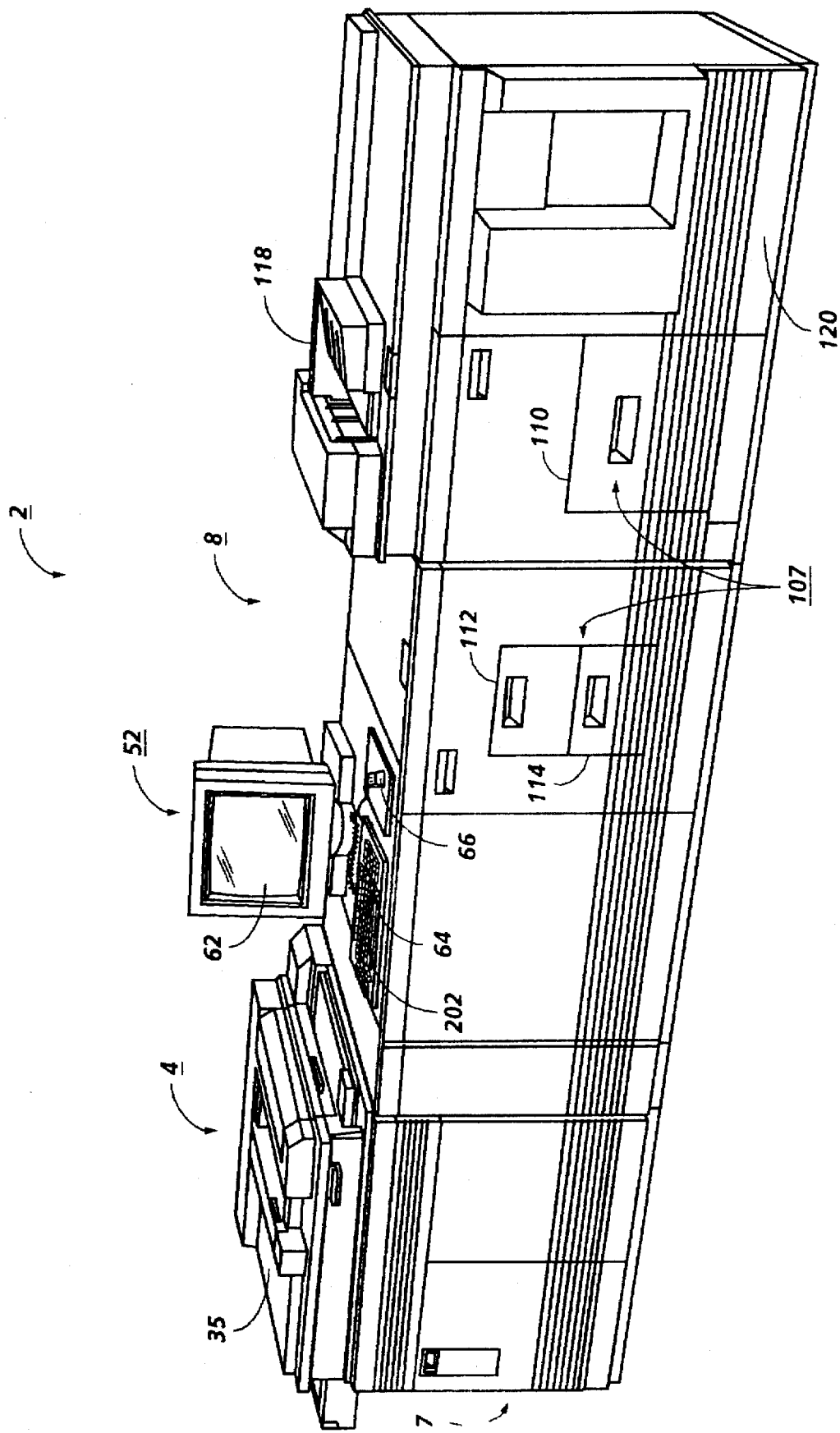
FIG. 1 is a perspective view depicting an electronic printer with which a memory management technique of the present invention can be employed.
Figure 2:
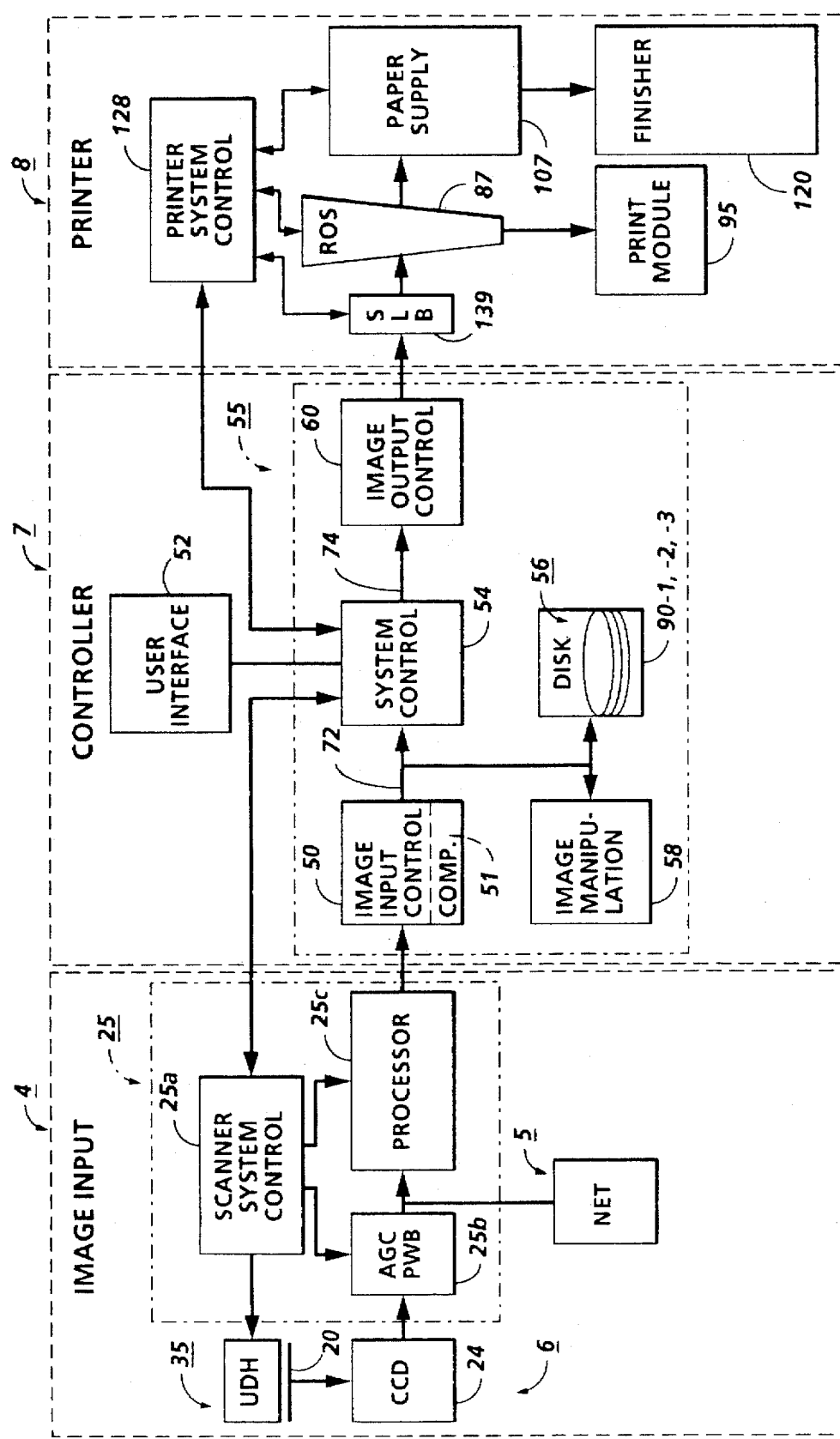
FIG. 2 is a block diagram depicting the major elements of the printer shown in FIG. 1.

Referring to the drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2, for purposes of explanation, is divided into image input section 4, controller section 7, and printer section 8. In the example shown, the image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and, furthermore, may be incorporated in electronic display systems, such as CRTs, LCDs, LEDs, etc. or else other image scanning/processing/recording systems, or else other signal transmitting/receiving, recording systems, etc. as well.

For off-site image input, image input section 4 has, in one example, a network 5 with a suitable communication channel such as an EtherNet® connection enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, video camera, etc. may be envisioned.

For on-site image input, section 4 has a document scanner section 6 with a Universal Document Handler (UDH) 35 for the purpose of automatically and sequentially placing and locating sets of multiple documents for scanning. Scanner section 6 incorporates one or more linear light sensitive arrays 24 for reciprocating scanning movement below platen 20 and focused on a line-like segment of platen 20 and the document being scanned thereon. Array 24, which may utilize Charge-Coupled Device (CCD) technology or the like, provides image elemental signals or pixels representative of the image scanned which are input to processor 25 for processing.

Processor 25 communicates with the controller section 7 and includes a scanner system control 25a, an automatic gain control printing wiring board (AGCPWB) 25b, and a processor 25c. AGCPWB 25b converts the analog image signals output by array 24 to digitally represented facsimile signals and processor 25c processes the digital image signals as required to enable controller section 7 to store and handle the image in the form and order required to carry out the job programmed. After processing, the image signals are output to controller section 7. Image signals derived from net 5 are similarly input to processor 25c.

Processor 25c also provides enhancements and changes to the image signals such as filtering, thresholding, screening, cropping, scaling (reduction/enlargement), etc. Following any changes and adjustments in the job program which affect these image processing parameters, the document must be rescanned to capture the specified modification.

Printer section 8 comprises a laser type printer having a Raster Output Scanner (ROS) 87, Print Module 95, Paper Supply 107, Finisher 120, and Printer System Control 128. ROS 87 has a two beam laser with the beams modulated in accordance with the content of an image signal input by acousto-optic modulator to provide dual imaging beams which are scanned across a moving photoreceptor of Print Module 95 by means of a rotating polygon. This exposes two image lines on the photoreceptor with each scan to create the latent electrostatic images represented by the image signal input to the modulator.

The latent electrostatic images are developed and transferred to a print media delivered by paper supply 107. As will be appreciated by those skilled in the art, print media can comprise a selected one of various known substrates which are capable of accepting an image, such substrates including transparencies, preprinted sheets, vellum, glossy covered stock, film or the like. The print media may comprise any of a variety of sheet sizes, types, and colors, and for this, plural media supply trays 110, 112, 114 (FIG. 1) are provided. The transferred image is permanently fixed or fused and the resulting prints discharged to either output tray 118 (FIG. 1), or to finisher 120. Finisher 120 provides certain finishing selections such as a stitcher for stitching or stapling the prints together to form books, a thermal binder for adhesively binding the prints into books, and/or other finishing options such as slitting, perforating, saddle stitching, folding, trimming, or the like.

Printer system control 128 (FIG. 2) automatically and precisely controls all the printer functions and operations in accordance with job program parameters received from system control 54 of controller section 7, as well as from internally derived signals from sensors and processes within the printer section 8. Printer system control signals are derived and distributed via a plurality of printed wiring boards (PWBs) in a multi-processor architecture characterized by multiple microprocessor controller cores, serially interconnected, and also serially linked to more numerous input/output processing circuit PWBs. Controller section 7 is, for explanation purposes, divided into an image input control 50, User Interface (UI) 52, system control 54, main memory 56, image manipulation section 58, and image output control 60. The units 50, 54, 56, 58, 60 comprise a system which may also generally be referred to as the "Electronic Subsystem" (ESS).

The scanned image data input from processor 25c of scanner section 6 to controller section 7 is compressed by image compressor/processor 51 of image input control 50 and placed in an image file. Image files, which represent different print jobs, are temporarily stored in system memory 61 (seen in FIG. 3A) pending transfer to main memory 56 where the data is held pending use.

Referring again to FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, and to obtain system operating information, visual document facsimile display, programming information and icons, diagnostic information and pictorial views, etc. Items displayed on touchscreen 62 such as files and icons are actuated by either touching the displayed item on screen 62 with a finger, or by using mouse 66 to point cursor 67 (seen in FIG. 4) to the item selected and keying the mouse.

Main memory 56 (FIG. 2) has plural hard disks 90-1, 90-2, 90-3 for storing machine Operating System software, machine operating data, and the scanned image data currently being processed. When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation, make ready (document editing), decomposition, rotation, etc., are carried out. Following processing, the data may be returned to main memory 56, sent to UI 52 for display on touchscreen 62, or sent to image output control 60.

Figure 3:
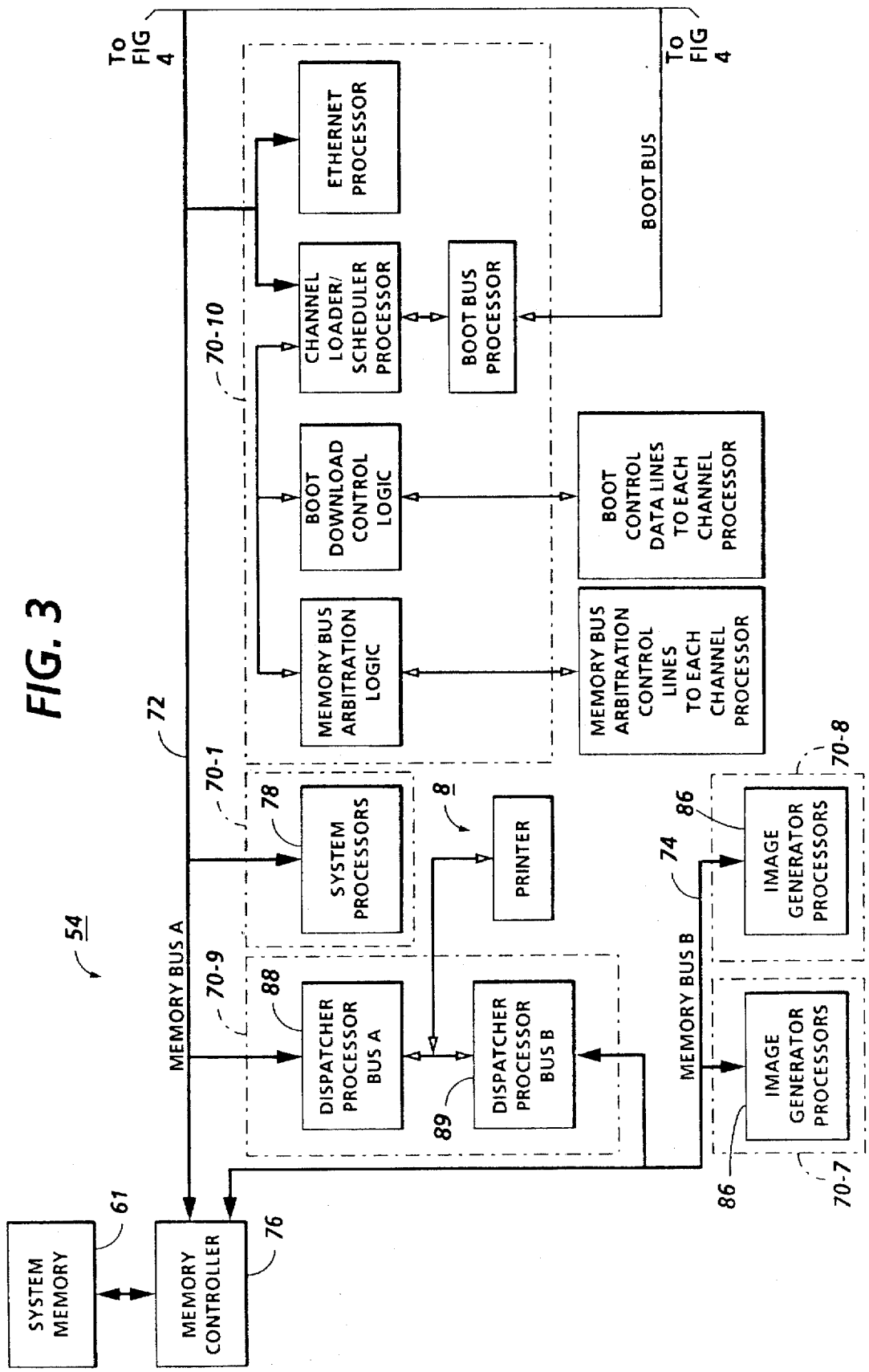
FIGS. 3–5 comprise a schematic block diagram showing the major parts of a controller for the printer shown in FIGS. 1 and 2.
Figure 4:
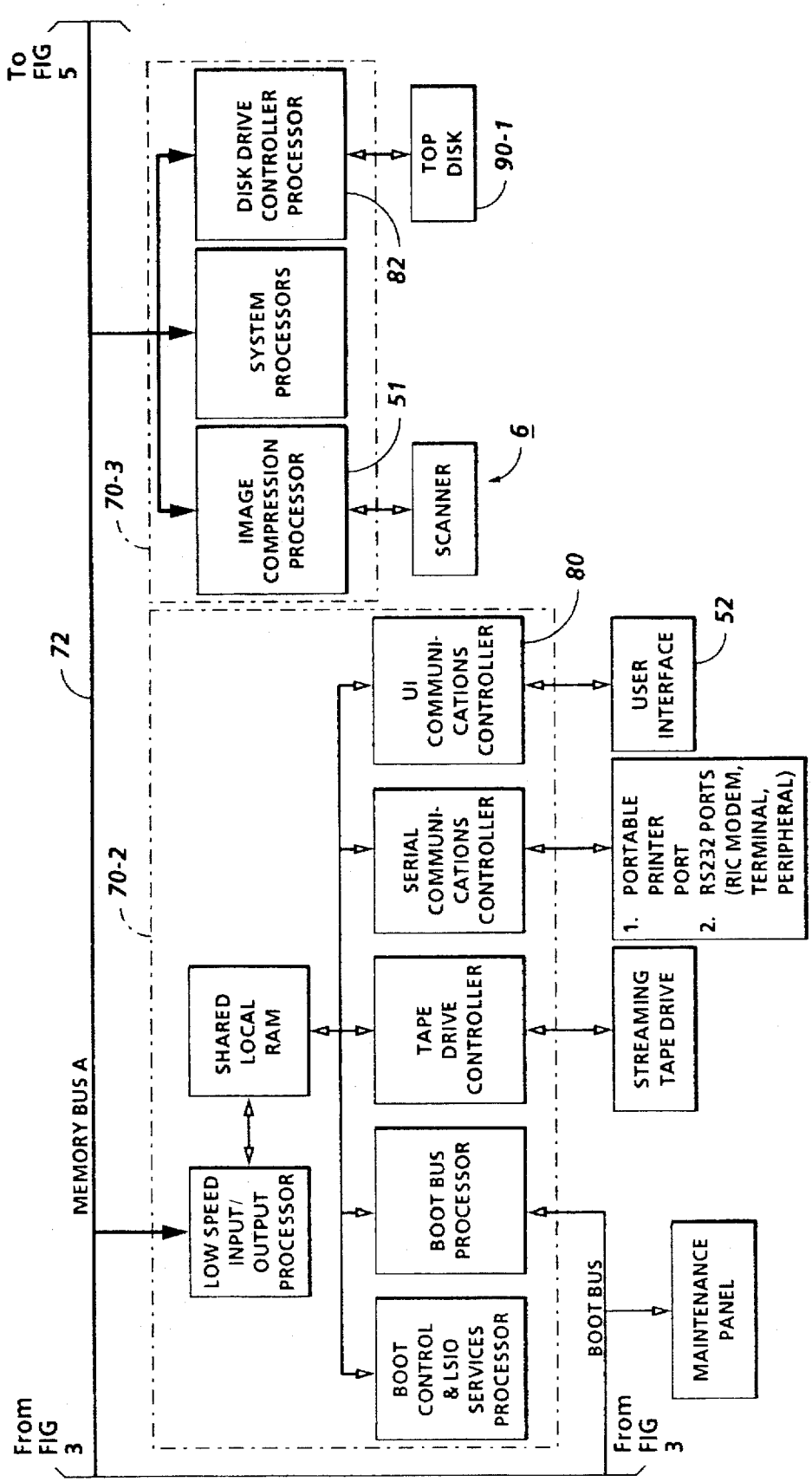
Figure 5:
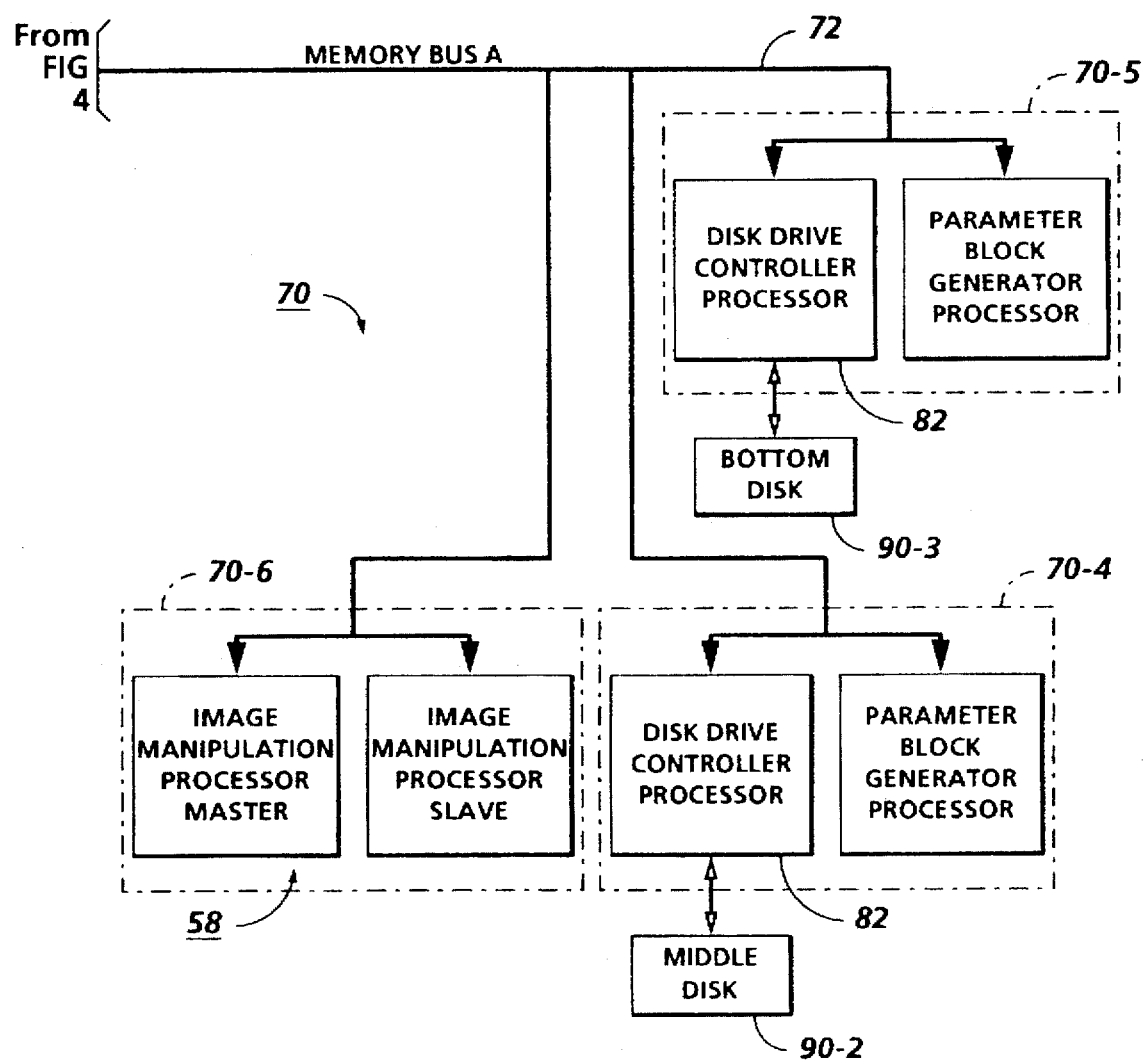

Referring particularly to FIGS. 3–5, image data output to image output control 60 is decompressed and readied for printing by image generating processors 86 of PWBs 70-7, 70-8. Following this, the data is output by dispatch processors 88, 89 on PWB 70-9 via Scan Line Buffer (SLB) 139 (FIG. 2) to printer section 8. Image data sent to printer section 8 for printing is normally purged from memory 56 to make room for new image data.

Control section 7 includes a plurality of Printed Wiring Boards (PWBs) 70 (FIGS. 3–5), PWBs 70 being coupled with one another and with System Memory 61 by a pair of memory buses 72, 74. A memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Figure 6:
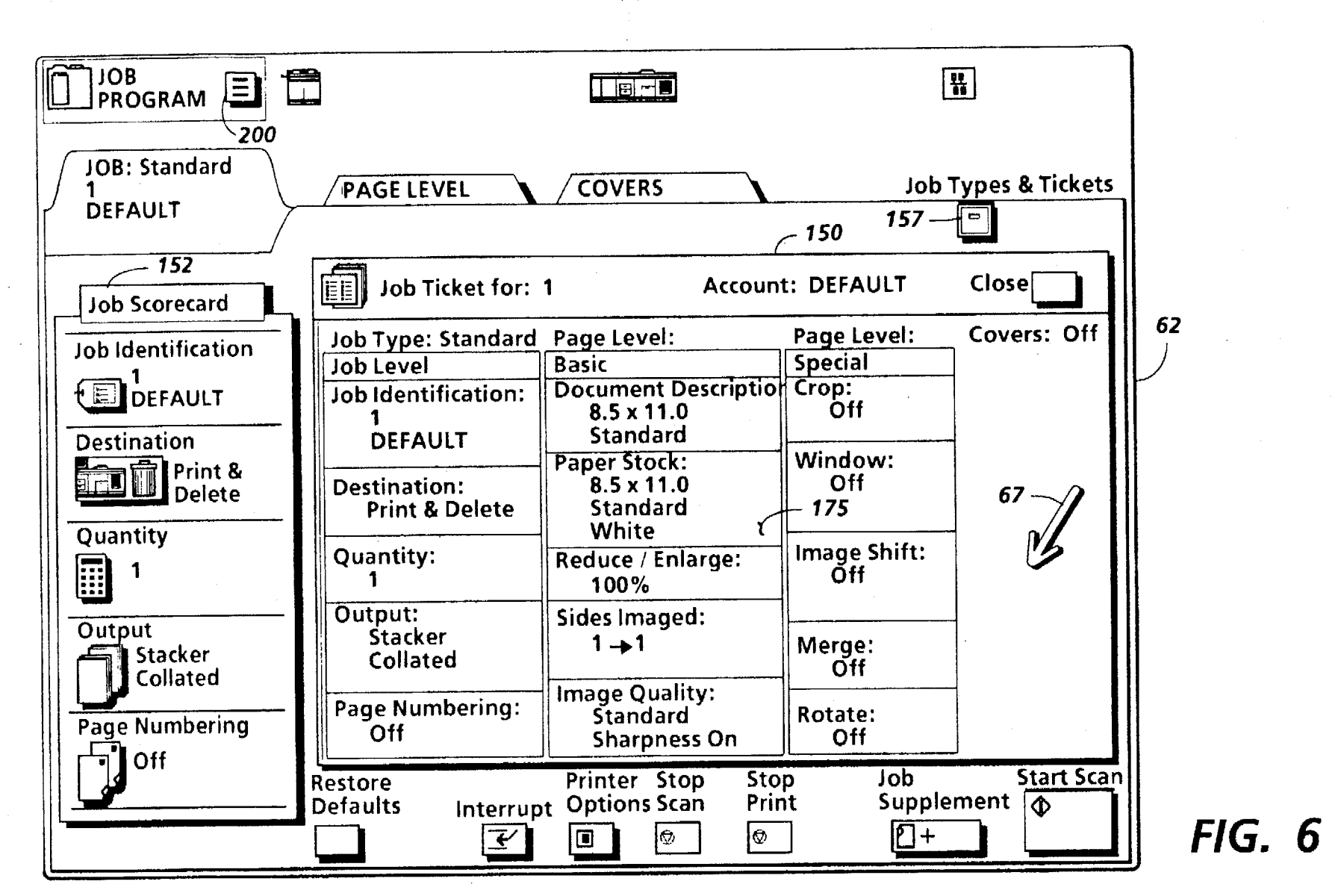

Referring to FIG. 6, jobs are programmed in a Job Program mode in which there is displayed on touchscreen 62 a Job Ticket 150 and a Job Scorecard 152 for the job being programmed. Job Ticket 150 displays various job selections available for programming, while Job Scorecard 152 displays the basic instructions to the system for printing the job. Various Job Ticket types are provided, with access by means of Job Types and Tickets icon 157.

Job Tickets 150 have three programming levels, referred to as "Job Level", "Basic", and "Special", each having a series of icons for accessing the various programming selections available at that level. Each programming level has a Scorecard 152 associated with it so that on activation of a particular job level or of a specific icon, the appropriate Scorecard is displayed on touchscreen 62.

As described, print jobs may be derived from multiple sources, i.e., jobs scanned in using scanner 6 for printing; jobs scanned in, stored, and then edited or added to for printing later; jobs remotely scanned in and submitted to the system as, for example, through net 5 (FIG. 2); jobs remotely developed and then submitted to the system for printing, etc.

Figure 7:
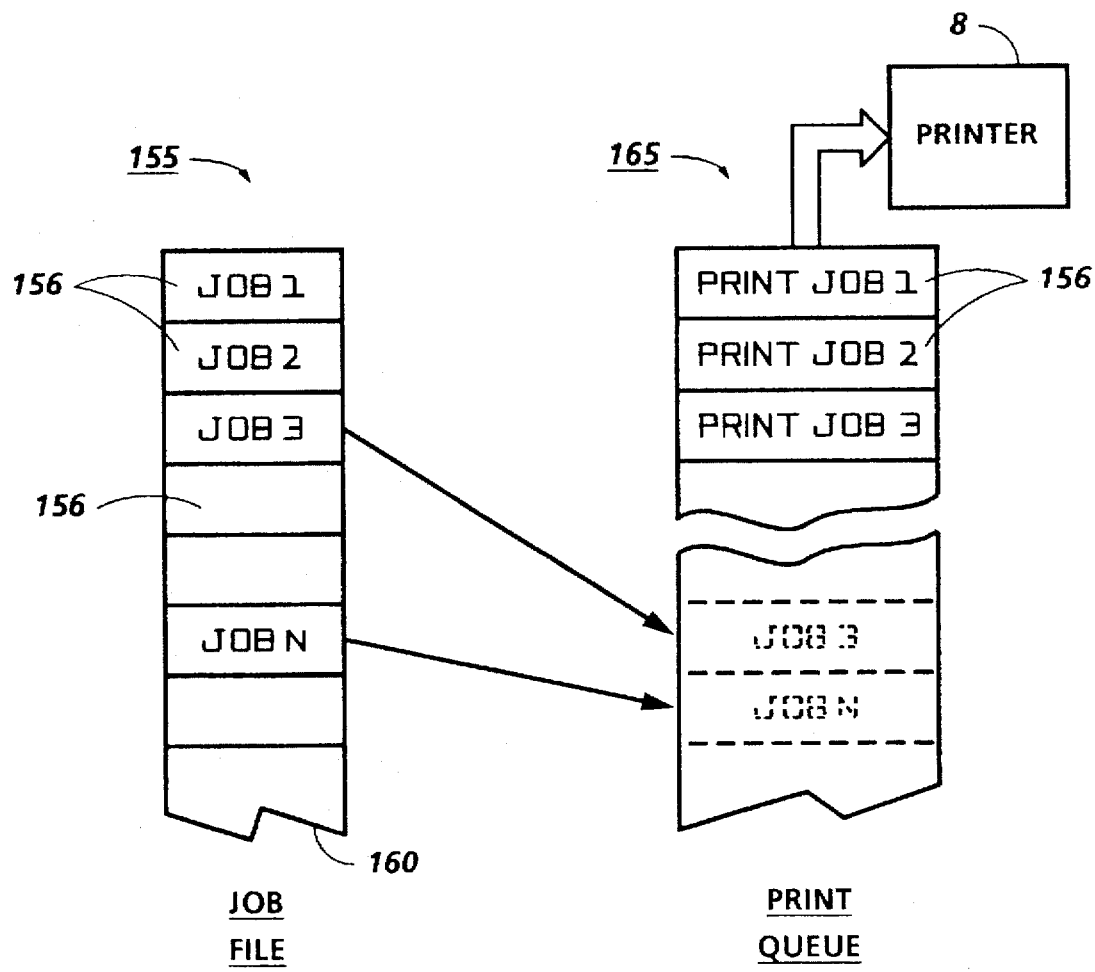
FIG. 7 is a schematic view depicting a Job File and a Print Queue, each being associated with the controller of the printer of FIG. 1.
Figure 8:
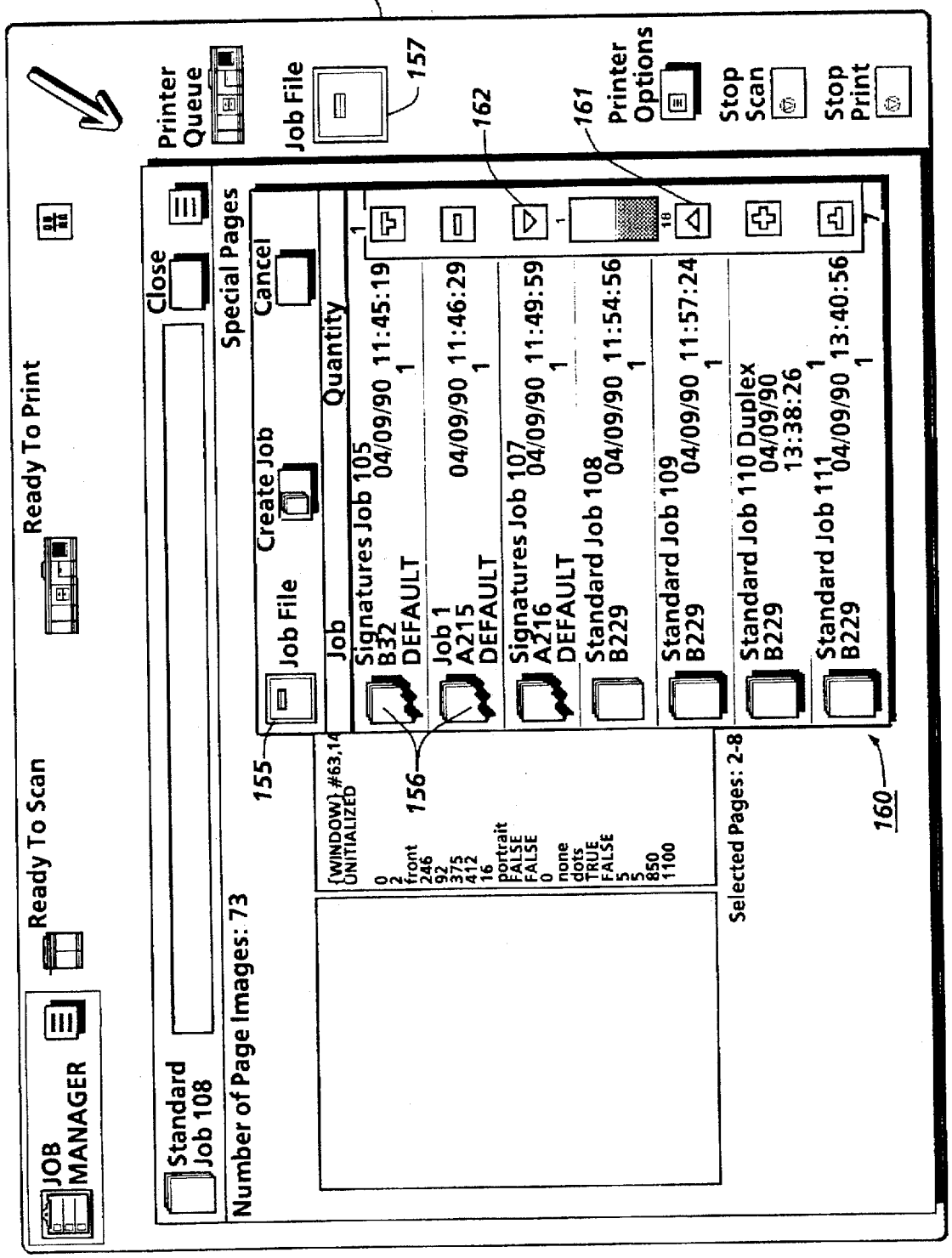
FIG. 8 is an elevational view of the User Interface touchscreen display depicting a Job File for storing typical jobs of the printing system.

Referring to FIGS. 7 and 8, the image files are arranged in a job file 155, with the print jobs 156 numbered consecutively in the order in which the print jobs are scanned in or labeled as a system operator or network user may specify. Where the operator wishes to see the jobs currently residing in job file 155, as for example, to select jobs to be moved to the print queue for printing, a SYSTEM FILE icon 157 on touchscreen 62 is actuated. This displays a list 160 of the jobs 156 currently in the job file on screen 62, an example of which is shown in FIG. 8. Each job is identified by a descriptor showing the type of job, job number, number of prints, etc. By using up and down scrolling icons 161, 162, the operator can scroll the list of jobs where the number of jobs in the job file is too large to be simultaneously displayed on touchscreen 62.

Figure 9:
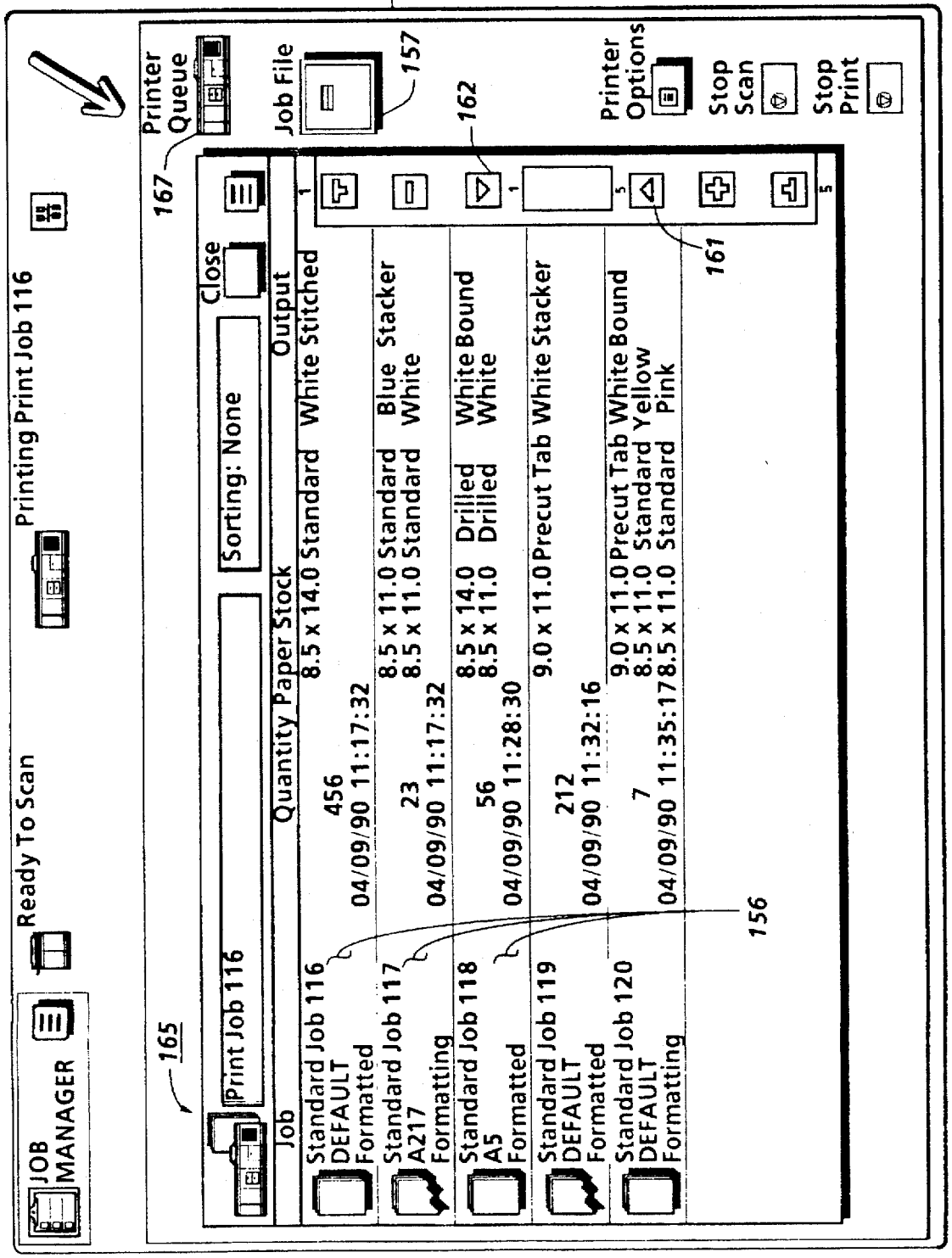
FIG. 9 is an elevational view of the User Interface touchscreen display depicting a print queue of typical jobs to be printed.

Referring also to FIG. 9, to print a job 156, the job is copied into a print queue 165. A PRINTER QUEUE icon 167 on touchscreen 62, when actuated, displays the current print queue with a list of the jobs in the queue on touchscreen 62. Each job in print queue 165 has a displayed job descriptor identifying the job, job number, quantity to be printed, paper color, finishing type, etc. Print queue 165 is ordered by priority and time of arrival of the job in the print queue. Other priority orderings may be envisioned.

Figure 10:
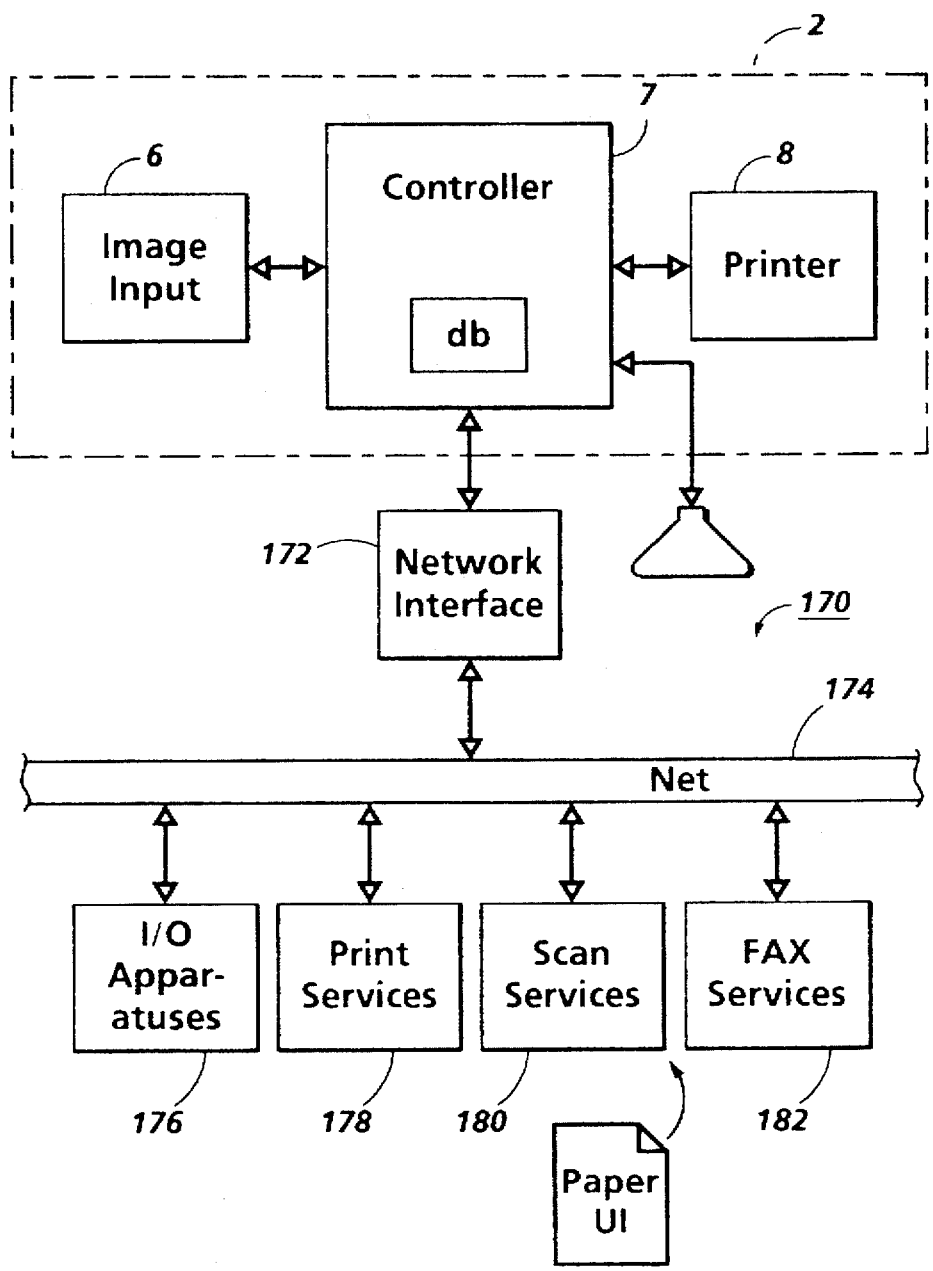
FIG. 10 is a block diagram depicting a network printing system including the printing system of FIG. 2.

Referring to FIG. 10, the controller is coupled with network arrangement 170 by way of a network interface 172. The network interface 172 includes all of the hardware and software necessary to relate the hardware/software components of the controller 7 with the hardware/software components of the network arrangement 170. For instance, to interface various protocols between the server and the network arrangement, the network interface could be provided with, among other software, Netware® from Novell Corp.

To facilitate communication from both telecommunications and Facsimile ("FAX") sources, the network interface is preferably provided with dedicated hardware from New Voice Inc., designated by the serial number "NV800". The NV800, which includes a dedicated processor, serving to implement a modem capability, is a multiplexing type device, i.e. a PBX adapted device, for facilitating the linking of multiple (e.g. 8) FAX/voice based lines to the controller 7. More particularly, the NV800 permits multiple users to access and use the controller 7 in a multiplexed fashion. Preferably, the New Voice system is used in conjunction with dedicated software referred to as "DAX" and manufactured by Ram Research. Additionally, as will appear from a discussion, it is desirable to provide the controller with the capability to record messages, via telephone or FAX, and store those messages on disk. This can be achieved readily through use of suitable hardware and software, such as the NV800 and DAX. A playback system, part of which includes a speaker 173, is preferably provided at the controller so that recorded messages can be accessed and listened to by an operator of the printing system 2. A playback system suitable for this use is produced by Sun Microsystems, Inc.

In the network arrangement 170, various I/O and storage devices are interconnected with a bus 174. In particular, the devices include, among others the following: I/O Apparatuses 176, Print Services 178, Scan Services 180 and FAX Services 182. In the present example a given I/O Apparatus may include a telephone and/or a workstation, such as any suitable PC compatible apparatus. In one example, the telephone, PC and FAX capability is provided by an integrated digital apparatus, such as that manufactured by Canon Corp. under the series name of "Navigator HD40". While in this example, the telephone is digitally based so that no interface, such as a modem, is required, in other examples the telephone could employ a suitable telecommunications interface without affecting the concept underlying the currently disclosed embodiment.

In one embodiment, the printing system 2 is a DocuTech® Network Printing System ("Network Printer") which prints jobs transmitted from one of the I/O apparatuses 176, such as a Xerox® 6085 workstation. In one embodiment, the Network Printer processes network jobs written in a page description language ("PDL") known as "Interpress" and as a prerequisite to printing the network job, the Network Printer decomposes the job from a high level primitive form to a lower level primitive form. The decomposition process is discussed in further detail in now allowed U.S. application Ser. No. 07/898,761 entitled "Apparatus and Method for Multi-Stage/Multi-Process Decomposing", filed on Jun. 12, 1992, by Bonk et al., the pertinent portions of which are incorporated herein by reference. In another embodiment the Network Printer is used, in conjunction with a DocuTech® Network Server, see Print Services 178, to print jobs written in, among other PDLs, Postscript®. The structure and operation of the DocuTech® Network Server may be more fully comprehended by reference to U.S. Pat. No. 5,226,112 to Mensing et al., the pertinent portions of which are incorporated herein by reference. Decomposed jobs are commonly stored, for output, in the job file 155 (FIG. 8) of the Network Printer and later transferred to the print queue 165 (FIG. 9) for printing.

Preferably, the Scan Service 180 includes a workstation and a scanner, provided in the form of a package. This sort of package is made available by Xerox Corporation in the form of a WG40 scanner coupled with a 6085 workstation. It will be appreciated that the Scan Service is preferably provided with Optical Character Recognition ("OCR") capability so that the user of the controller 7 can scan hard-copy, such as a sheet referred to as "Paper UI", for use by the controller 7. As is known, the Paper UI can be used to provide a controller with appropriate directives for a job, such as printing and/or finishing instructions. An example of Paper UI, and its application can be obtained by reference to U.S. Pat. No. 5,051,779 to Hikawa, the pertinent portions of which are incorporated herein by reference. Finally, the FAX Service 182 assumes the form of any suitable networked FAX device, such as the LAN FAX Service manufactured by Xerox Corporation under the 7032 series. Details regarding the coupling of a FAX component with a printing system can be found in U.S. Pat. No. 4,821,107 to Naito et al., the pertinent portions of which are incorporated herein by reference.

Figure 11:
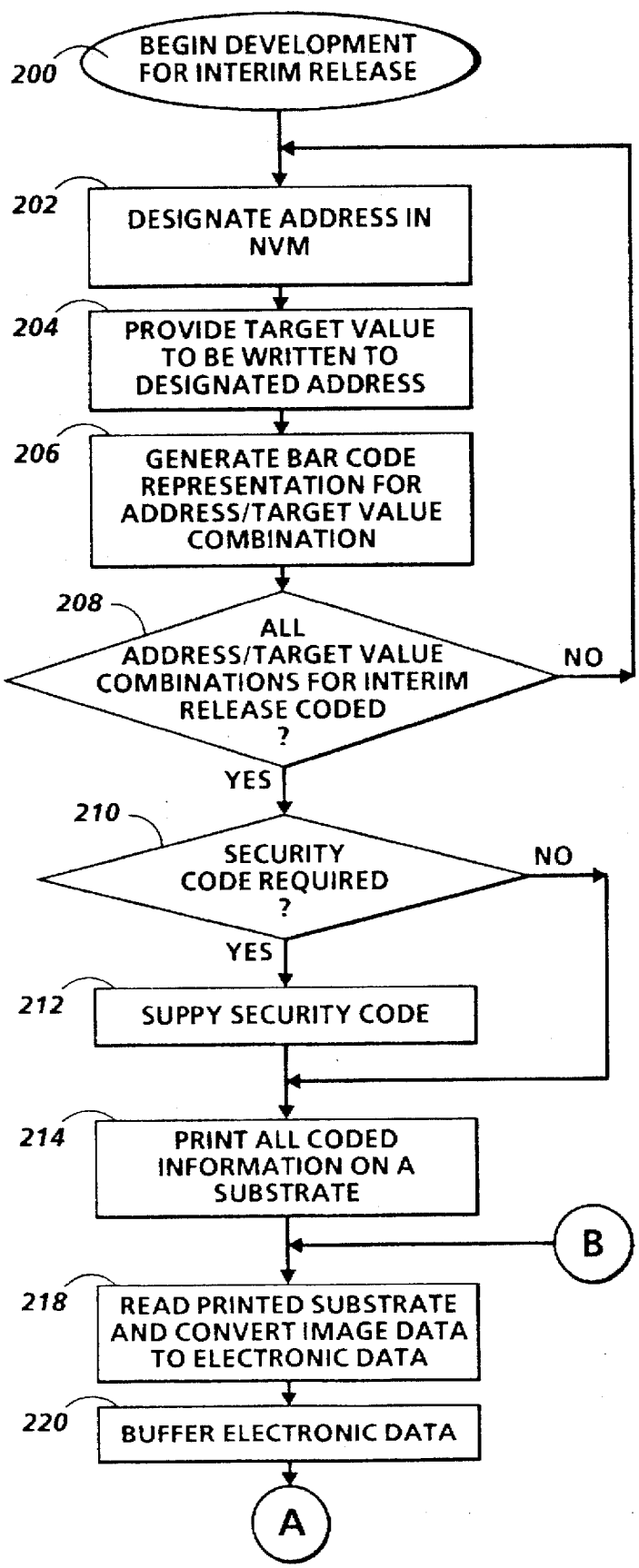
FIGS. 11 is a flow diagram demonstrating a process for developing an interim release, in terms of a control sheet with machine readable code.
Figure 12:
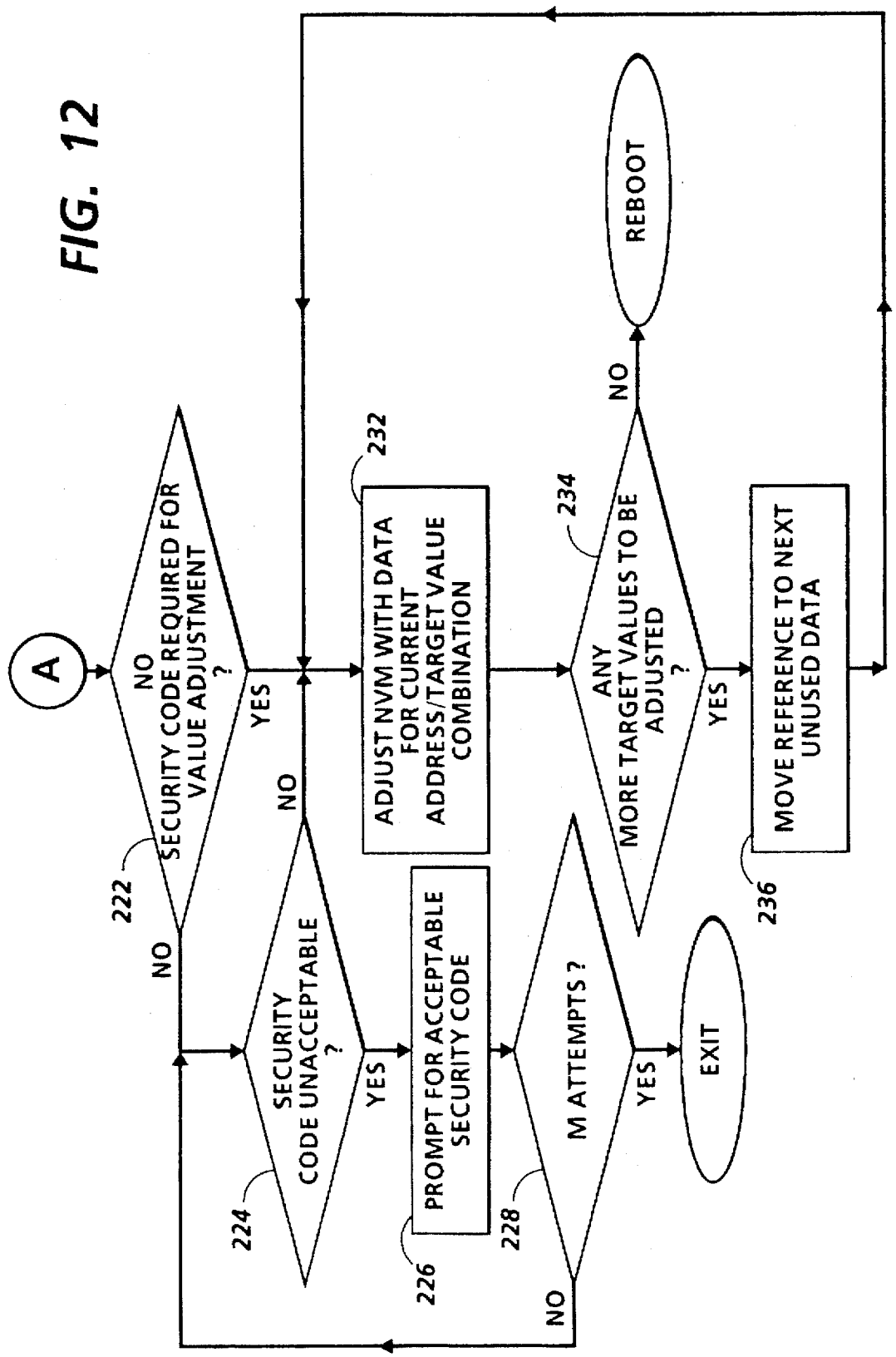
FIG. 12 is a flow diagram demonstrating a process for adjusting target values used to control nonvolatile memory ("NVM")
Figure 13:
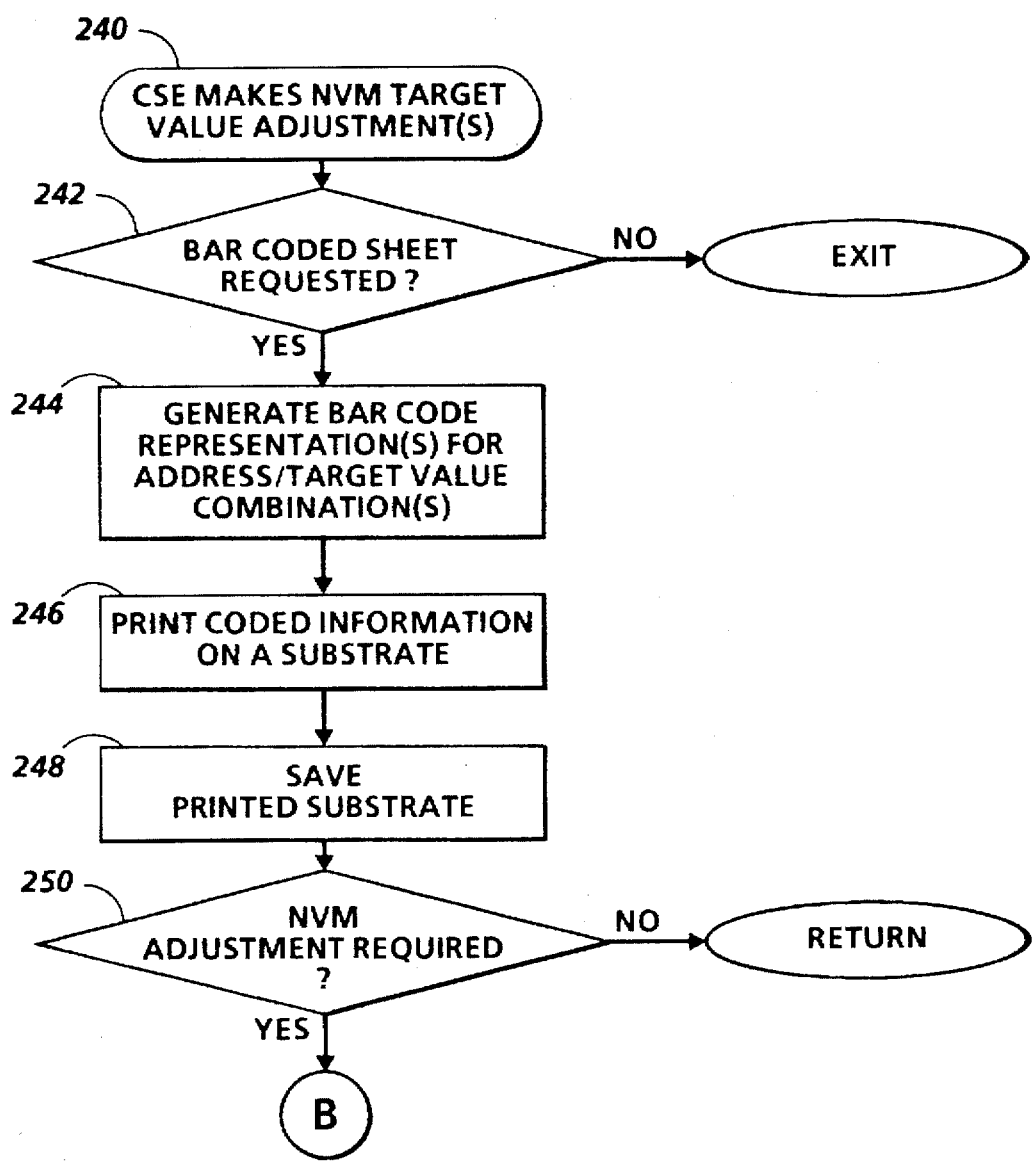
FIG. 13 is a flow diagram demonstrating a process for generating a control sheet with stored target values for NVM.

Referring to FIGS. 11–13, a preferred technique for managing the settings of NVM values with machine readable code reproduced on print media sheets is shown. In general, FIG. 11 illustrates a preferred approach for developing an interim release, in terms of a control sheet, FIGS. 11 and 12 illustrate a methodology for using the control sheet to adjust NVM target values, and FIG. 13 illustrates a technique for generating a control sheet to reflect selected NVM target values stored at the printing machine. Typically, as will appear, certain steps of FIG. 12 are appropriate for use with the control sheet developed in accordance with the procedure of either FIG. 11 or FIG. 13.

Referring specifically to FIG. 11, it is contemplated, in the preferred embodiment, that certain features are enabled in a NVM of a printing machine through use of a controlled sheet representing an interim release (Step 200). To generate information for the control sheet, a selected location at which a first NVM control or target value exists is, by way of step 202, designated. The target value to be written at that designated address is, by way of step 204, then provided. Using functionality present in the DocuTech Printing System manufactured by Xerox Corporation a bar code representation of the address/target value combination is, by way of step 206, generated. At step 208, it is determined whether all address/target value combinations and their respective corresponding bar codes have been created. As will be appreciated by those skilled in the art, machine readable code other than bar codes (e.g. glyphs) could be used to generate the control sheet without affecting the principles upon which the preferred embodiment is based.

Once all of the address/value combinations have been provided, it is determined, at step 210, whether a security code is required to be printed on the control sheet. It should be appreciated that certain interim releases by their very nature will require a security code so that enablement of features on a given printing machine will only be available to a certain user set. Assuming that a security code is required, suitable machine readable code is, by way of step 212, supplied for the security code. Once all of the coded information necessary to make the control sheet has been generated or supplied, the coded information is, by way of step 214, printed on appropriate substrate with a suitable printer 8 (FIG. 2). While a specific control sheet including machine readable code is not shown in the present application, employment of a sheet of the type disclosed by U.S. Pat. No. 4,716,438 or U.S. Pat. No. 4,987,447 would be suitable.

Commonly, the above discussed control sheet would be generated at a first facility and then employed at a second facility, the second facility being disposed remotely relative to the first facility. Referring still to FIG. 11, the control sheet would be read at the second site, by way of step 218, and the information on the sheet converted to image data. It will be appreciated that the information on the control sheet can assume one of several forms. In the preferred embodiment, addresses and target values are present in the form of machine readable code, but, alternatively, the machine readable code could simply refer to one or more locations in memory where the target values are stored. In a network system, of the type shown in FIG. 10, the addresses and target values could be stored remotely of the machine at which NVM values are adjusted. By way of step 220, all information read from the printed substrate is buffered as image data.

Referring to FIG. 12, at step 222, a check is performed to determine if a security code is required to enable NVM value adjustment. Preferably, printing machine features are not enabled without the presence of a security code i.e. machine readable code indicating that the printing machine subjected to the present adjustment corresponds with the provided security code.

Assuming a security code is required, a check is performed at step 224 to determine whether the provided security code is acceptable. If the provided security code is unacceptable, then the control system of the printing machine prompts the user to provide an acceptable security code (step 226). The decision step at 228 determines whether the user has spent all of his/her opportunities to provide an acceptable security code. If, after M attempts no suitable security code is provided, the program exits.

If a suitable security code is provided or no security code was necessary to begin with, the process proceeds to step 232 where a first address/target value combination of NVM, corresponding with a reference or pointer, is adjusted. If any more target values need be adjusted (see step 234), then the pointer is moved to the next unused buffered data for adjustment of another NVM target value (step 236). In the preferred embodiment, the above-mentioned data is buffered in RAM and, upon rebooting, are flushed to disk for purposes of loading new values in the NVM. Once all of the target values have been adjusted, the printing machine is rebooted for giving effect to the newly entered target values.

Referring to FIG. 13, a portion of a technique for reinstalling NVM operational parameters is shown. At step 240, a customer service engineer "CSE" makes appropriate NVM target value adjustment(s) for purposes of optimizing machine operation or simply enabling features. As will appear, under certain circumstances it may be desirable to save certain selected NVM values for future reference. In the illustrated embodiment of FIG. 13, if a bar coded sheet i.e. control sheet, is requested (see step 242), then, at step 244, machine readable code representation(s) (e.g. bar code representations) are generated for target values residing at respective corresponding addresses in NVM. Once all of the target values have been set by way of step 244, the machine readable code representations are printed on a suitable substrate (step 246) and the printed substrate is saved for future reference (step 248). When NVM adjustment is required, due to, for example, machine failure, the technique of FIG. 12 is employed to read the control sheet and set the target values of NVM to their appropriate levels.

Numerous features of the above-described embodiment(s) will be appreciated by those skilled in the art. First, a scanner is usable with a sheet including machine readable code for installing an interim software release. This is both convenient and cost effective for a machine user in that the interim release can be installed by the user, as opposed to a customer service engineer ("CSE"), and such installation is achieved by simply reading the machine readable code with the scanner.

Second, the scanner is usable with the coded sheet to recreate target values for non-volatile memory ("NVM") subsequent to a crash of a host printing machine operating system. More particularly, in one embodiment the CSE sets NVM target values and then records the resulting target values on a sheet, in the form of machine readable code. Accordingly, when the host printing machine operating system fails, the NVM target values can be reset with the scanner and the sheet, provided the scanner can be "brought up".

Finally, when appropriate, a machine readable coded sheet is advantageously provided with a security code. In this manner, only users authorized to use a designated printing machine are empowered to alter NVM values on the designated printing machine or, more particularly, to activate software resident on the designated printing machine.

What is claimed is:

1. In a printing system for executing programmed jobs and having both non-volatile memory and a subsystem thereof disposable in either a first state or a second state, the first state corresponding with the subsystem being one of enabled and disabled, the second state corresponding with the subsystem being the other of enabled and disabled, the subsystem being disposed in the first state when the non-volatile memory is set with a first value and the second state when the non-volatile memory is set with a second value, a system for changing the state of the subsystem automatically from the first state to the second state, comprising:

a) a substrate including a representation of machine readable code, the representation of the machine readable code corresponding with the second value;

b) a raster image processing device for scanning the substrate to read the representation of the machine readable code;

c) a controller which, in response to scanning the substrate with said raster image processing device, changes the first value to the second value, in response to a reprogramming authorization signal, so that the state of the subsystem is changed automatically from the first state to the second state: and d) wherein the subsystem remains in the second state for all subsequent jobs executed in the printing system until the printing system is reprogrammed by changing the second value back to the first value with the reprogramming authorization signal.

2. The system of claim 1, in which the substrate is provided with a second representation corresponding with machine readable code corresponding with a security clearance indicator, wherein said controller determines if the representation of the machine readable code corresponding with the security clearance indicator has been read with the raster image processing device and generates the reprogramming authorization signal in response to reading the security clearance indicator.

3. The system of claim 1, wherein the machine readable code comprises one or more bar codes.

4. In a printing system for executing programmed jobs and having both non-volatile memory and a subsystem thereof disposable in either a first state or a second state, the first state corresponding with the subsystem being one of enabled and disabled, the second state corresponding with the subsystem being the other of enabled and disabled, the subsystem being disposed in the first state when the non-volatile memory is set with a first value and the second state when the non-volatile memory is set with a second value, a method for changing the state of the subsystem automatically from the first state to the second state, comprising:

a) providing a substrate including a representation of machine readable code, the representation of the machine readable code corresponding with the second value;

b) scanning the substrate, with a raster image processing device, to read the representation of the machine readable code;

c) in response to said b), changing the first value to the second value, when a programming authorization signal is detected, so that the state of the subsystem is changed automatically from the first state to the second state; and d) wherein the subsystem remains in the second state for all subsequent jobs executed in the printing system until the printing system is reprogrammed by changing the second value back to the first value with the programming authorization signal.

5. The method of claim 4, in which the substrate is provided with a second representation corresponding with machine readable code corresponding with a security clearance indicator, wherein said c) includes determining if the representation of the machine readable code corresponding with the security clearance indicator has been read with the raster image processing device and generating the programming authorization signal in response to reading the security clearance indicator.

6. The method of claim 4, wherein said a) includes providing the substrate with a bar code corresponding with the second value.

* * * * *